(12) United States Patent
Shen et al.

(10) Patent No.: US 11,024,223 B2
(45) Date of Patent: Jun. 1, 2021

(54) DEVICE WITH INFORMATION DISPLAYED IN A POWER-OFF MODE

(71) Applicant: Microsoft Technology Licensing, LLC, Redmond, WA (US)

(72) Inventors: Haibin Shen, Beijing (CN); Yang Su, Taiyuan (CN); Wei Hu, Beijing (CN); Xingxing Wu, Beijing (CN); Yang Liu, Beijing (CN); Jing Zhao, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 16/062,589

(22) PCT Filed: Dec. 22, 2016

(86) PCT No.: PCT/US2016/068379
§ 371 (c)(1),
(2) Date: Jun. 14, 2018

(87) PCT Pub. No.: WO2017/117008
PCT Pub. Date: Jul. 6, 2017

(65) Prior Publication Data
US 2018/0366057 A1   Dec. 20, 2018

(30) Foreign Application Priority Data
Dec. 30, 2015   (CN) .......................... 201511027609.9

(51) Int. Cl.
*G06F 3/038* (2013.01)
*G09G 3/3208* (2016.01)
(Continued)

(52) U.S. Cl.
CPC ......... *G09G 3/3208* (2013.01); *G06F 1/3212* (2013.01); *G09G 3/32* (2013.01);
(Continued)

(58) Field of Classification Search
USPC ....... 345/211, 212, 213, 501, 546, 589, 204, 345/214
See application file for complete search history.

(56) References Cited

U.S. PATENT DOCUMENTS

| 8,106,534 B2 | 1/2012 | Spurlin et al. |
| 8,212,403 B2 | 7/2012 | Dai et al. |
| (Continued) | | |

FOREIGN PATENT DOCUMENTS

| CN | 101004942 B | 9/2010 |
| CN | 102854824 A | 1/2013 |
| (Continued) | | |

OTHER PUBLICATIONS

"International Preliminary Report on Patentability Issued in PCT Application No. PCT/US2016/068379", dated Apr. 3, 2018, 7 Pages.
(Continued)

*Primary Examiner* — Thuy N Pardo
(74) *Attorney, Agent, or Firm* — Alleman Hall Creasman & Tuttle LLP

(57) ABSTRACT

In implementations of the subject matter described herein, a device is provided. The device comprises a power source and a display. The device also comprises a buffer in communication with the display. The buffer is configured to store information to be displayed on the display. The device further comprises a power management unit. In a power-off mode of the device where remaining capacity of the power source is below a threshold, the power management unit powers the display and the buffer, so that the display can display the information stored in the buffer. In this way, even if the device is in the power-off mode due to the low capacity of the power source, the display can still present useful information to the user.

20 Claims, 5 Drawing Sheets

(51) Int. Cl.
 *G06F 1/3212* (2019.01)
 *G09G 3/32* (2016.01)
 *G09G 3/36* (2006.01)

(52) U.S. Cl.
 CPC ......... *G09G 3/36* (2013.01); *G09G 2330/021* (2013.01); *G09G 2330/026* (2013.01); *G09G 2354/00* (2013.01); *G09G 2360/18* (2013.01); *Y02D 10/00* (2018.01)

(56) References Cited

U.S. PATENT DOCUMENTS

| | | | |
|---|---|---|---|
| 8,369,904 B2 | 2/2013 | Bennis et al. | |
| 8,639,291 B1 | 1/2014 | Gailloux et al. | |
| 8,704,743 B2 | 4/2014 | Yao et al. | |
| 8,704,751 B2 | 4/2014 | Dunn et al. | |
| 8,829,847 B2 | 9/2014 | Eaton et al. | |
| 8,841,798 B2 | 9/2014 | Tuukkanen et al. | |
| 8,972,760 B1 | 3/2015 | Zajac | |
| 9,225,799 B1* | 12/2015 | Dong | G06F 3/14 345/211 |
| 9,654,603 B1* | 5/2017 | Dong | G06F 3/14 345/212 |
| 2007/0195074 A1* | 8/2007 | Gelissen | G09G 3/3406 345/204 |
| 2008/0045275 A1 | 2/2008 | Le | |
| 2008/0100636 A1* | 5/2008 | Lai | G09G 5/39 345/546 |
| 2009/0163248 A1 | 6/2009 | Liang et al. | |
| 2010/0124896 A1 | 5/2010 | Kumar | |
| 2011/0141083 A1 | 6/2011 | Lu et al. | |
| 2011/0145323 A1* | 6/2011 | Kahn | H04L 67/16 709/203 |
| 2012/0047380 A1 | 2/2012 | Nurmi | |
| 2012/0299941 A1* | 11/2012 | Lee | G09G 3/3406 345/582 |
| 2014/0035955 A1* | 2/2014 | Wang | G09G 5/005 345/660 |
| 2014/0098110 A1* | 4/2014 | Ju | G06T 9/00 345/501 |
| 2014/0104243 A1 | 4/2014 | Sakariya et al. | |
| 2014/0104298 A1* | 4/2014 | Park | G09G 5/10 345/589 |
| 2014/0198114 A1 | 7/2014 | Nambi et al. | |
| 2014/0210874 A1* | 7/2014 | Cheng | G09G 3/30 345/691 |
| 2014/0320465 A1* | 10/2014 | Oh | G09G 3/3688 345/204 |
| 2015/0015556 A1* | 1/2015 | Pappas | H03K 19/01714 345/211 |
| 2015/0228251 A1* | 8/2015 | Saito | G09G 3/3696 345/213 |
| 2016/0035306 A1* | 2/2016 | Park | G09G 3/3696 345/212 |
| 2016/0078837 A1* | 3/2016 | Hong | G09G 3/3688 345/690 |
| 2017/0054544 A1* | 2/2017 | Kazmi | H04B 17/309 345/212 |

FOREIGN PATENT DOCUMENTS

| | | |
|---|---|---|
| CN | 104035539 A | 9/2014 |
| EP | 1884914 A1 | 2/2008 |
| KR | 100671087 B1 | 1/2007 |
| KR | 101147746 B1 | 5/2012 |
| WO | 2015080530 A1 | 6/2015 |

OTHER PUBLICATIONS

"International Search Report and Written Opinion Issued in PCT Application No. PCT/US2016/068379", dated Mar. 17, 2017, 11 Pages.

"Second Written Opinion Issued in PCT Application No. PCT/US2016/068379", dated Nov. 27, 2017, 6 Pages.

"Kindle, Wi-Fi, 6" E Ink Display", Retrieved from: https://www.amazon.com/Kindle-Wi-Fi-Ink-Display-international/dp/B0051QVF7A, Retreived Date: Dec. 9, 2019, 10 Pages.

Devine, Richard, "Using Ultra Power Saving Mode on the Samsung Galaxy S5", Retrieved from: https://www.androidcentral.com/using-ultra-power-saver-samsung-galaxy-s5, May 5, 2014, 4 Pages.

Hoffelder, Nate, "New LCD Screen Tech Can Display Static Images with No Power", Retrieved from: https://the-digital-reader.com/2014/10/29/new-lcd-screen-tech-can-display-static-images-power/#.VHhl1bGLNgl, Oct. 29, 2014, 7 Pages.

Litchfield, Steve, "Nokia Works a LCD Miracle—Glance on the Lumia 920", Retrieved from: http://allaboutwindowsphone.com/features/item/18191_Nokia_works_a_LCD_miracle-Glan.php, Aug. 20, 2013, 19 Pages.

"Office Action Issued in European Patent Application No. 16823535.6", dated Apr. 2, 2020, 6 Pages.

"First Office Action and Search Report Issued in Chinese Patent Application No. 201511027609.9", dated Dec. 30, 2020, 9 Pages.

* cited by examiner

DEVICE WITH INFORMATION DISPLAYED IN A POWER-OFF MODE

CROSS REFERENCE TO RELATED APPLICATIONS

The present application is a U.S. National Phase of International Patent Application Serial No. PCT/US2016/068379 entitled "DEVICE WITH INFORMATION DISPLAYED IN A POWER-OFF MODE", filed Dec. 22, 2016, which claims priority to Chinese Patent Application Serial No. 2015110276099, filed Dec. 30, 2015, the entire contents of each of which are hereby incorporated by reference for all purposes.

BACKGROUND

With development of the communication technology, portable devices have become an important assistant for people to record information, remind events, and communicate with each other. Examples of the portable devices include, but are not limited to, a mobile phone, laptop computer, tablet computer, electronic book device, music player, and the like. The majority of portable devices are powered by a battery. If the remaining capacity of the battery runs low, the device will automatically be powered down and thus become completely useless until being recharged.

SUMMARY

In accordance with implementations of the subject matter described herein, a device is provided. The device comprises a power source and a display. The device also comprises a buffer in communication with the display. The buffer is configured to store information to be displayed on the display. The device further comprises a power management unit. In a power-off mode of the device where remaining capacity of the power source is below a threshold, the power management unit powers the display and the buffer, so that the display can display the information stored in the buffer. In this way, even if the device is in the power-off mode due to the low capacity of the power source, the display can still present useful information to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below.

As described above, a portable device is usually powered by a battery having limited battery lifetime. Conventionally, when remaining capacity of the battery runs low enough, the device will stop working and be turned off, thereby entering a power-off mode. In the power-off mode, all components of the device, including the display, are deactivated and no information will be displayed to the user anymore. That is, the device becomes completely useless.

Figure 1:
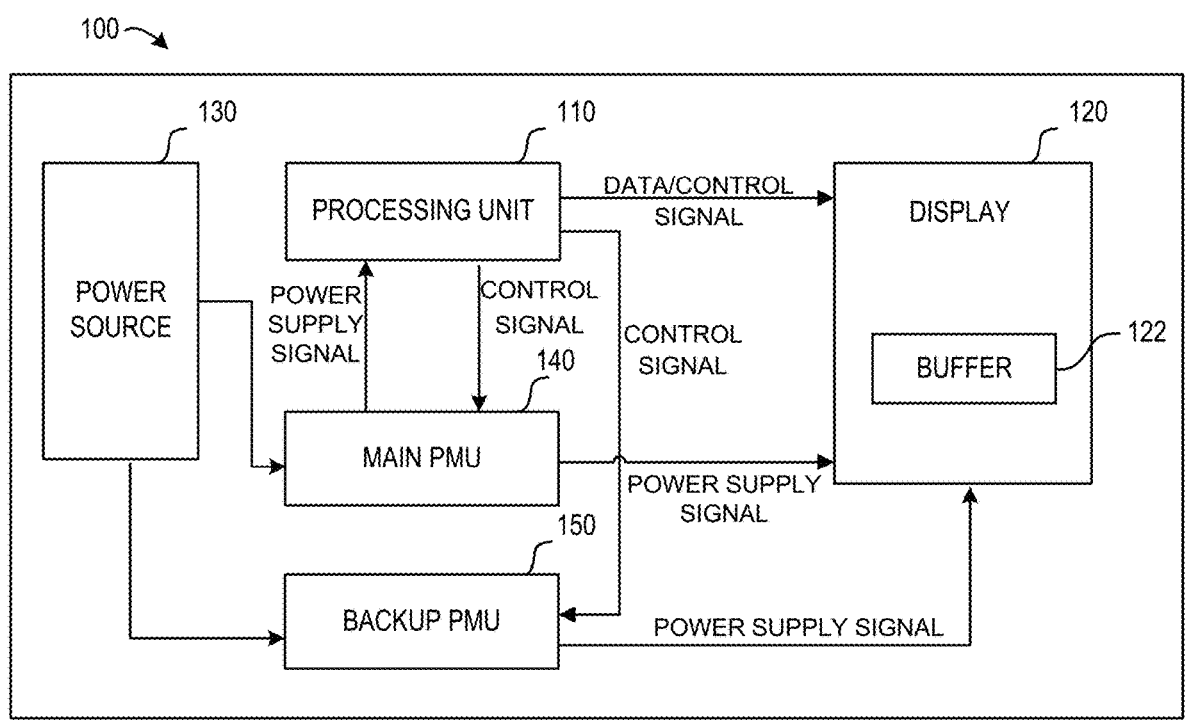
FIG. 1 illustrates a block diagram of a device in accordance with one implementation of the subject matter described herein.

FIG. 1 illustrates a block diagram of a device 100 in accordance with one implementation of the subject matter described herein. The structure and functionality of the device 100 are described only for the purpose of illustration without suggesting any limitations as to the scope of the subject matter described herein. The subject matter described herein can be embodied with different structure and/or functionality.

As shown, the device 100 includes at least one processing unit or processor 110. The processing unit 110 may comprise circuits or logic required to implement the functions of the device 100. The processing unit 110 executes computer-executable instructions and may be a real or a virtual processor. In a multi-processing system, multiple processing units execute computer-executable instructions to increase processing power. The processing unit 110 may include one or more central processing units, microprocessors, microcontrollers, digital signal processors, baseband processor integrated circuits, application specific integrated circuits, and/or the like.

The processing unit 110 may be used to control the operations of the device 100. With one suitable arrangement, the processing unit 110 may be used to run software on the device 100 such as email applications, locating applications, calendar applications, multimedia messaging service (MMS) application, instant messaging (IM) application, social media application, internet browsing applications, media playback applications, operating system functions, software for capturing and processing images, software implementing functions associated with gathering and processing sensor data, and the like.

The device 100 includes a display 120 to display information to the user. The processing unit 110 of the device 100 may transmit data and/or control signals to manage the information displayed on the display 120. The displayed information may include the data/information obtained by software/applications running at the device 100. The device 100 also includes a buffer 122 used to store the information to be displayed on the display 120. The buffer 122 is in communication with the display 120, so as to provide the stored information to be presented on the display 120. In the example of FIG. 1, the buffer 122 is internal to the display 120. The display 120 and the buffer 122 may be separate components in some other examples.

The display 120 may be implemented as a liquid crystal display (LCD) display, a light emitting diode (LED) display, or an organic light emitting diode (OLED) display, for example. In some implementations, the display 120 may be a touch-sensitive display. In this case, the display 120 may additionally receive user input and provide the input to the processing unit 110 for further processing. Although a single display 120 is shown in the example of FIG. 1, the device 100 may include two or more displays in some other examples.

The device 100 further includes a power source 130 for supplying power to various circuits or components required for operating the device 100. The power source 130 may be a rechargeable battery such as a lithium-ion battery, a lithium polymer battery, a nickel-hydrogen battery, a nickel-cadmium battery, or the like. Alternatively, or in addition, the power source 130 may be a non-rechargeable but removable battery. It is possible to use any other types of batteries either currently known or to be developed in the future. Although a single power source 130 is shown in the example of FIG. 1, the device 100 may include two or more power sources in some other examples. For ease of discussion, in the context of this disclosure, the terms "power source" and "battery" can be used interchangeably.

When the power source 130 has sufficient capacity, the device 100 operates in a normal operating mode. Driven by the power source 130, the processing unit 110 may process information and the display 120 may display information. Due to the power consumption by various components, the remaining capacity of the power source 130 is decreased as the device 100 operates. With the remaining capacity of the power source 130 decreasing to a certain level, the processing unit 110 will be powered off and cause the device 100 to switch to a power-off mode.

The power consumption of the display 120 is usually lower than that for the processing unit 110. As a result, although the processing unit 110 and other components of the device 100 stop operating, the remaining capacity of the power source 130 is still enough to drive the display 120 to display some information for a period of time. In accordance with implementations of the subject matter described herein, in the case that the remaining capacity of the power source 130 is below a threshold and the processing unit 110 is powered off, the remaining capacity is used to continue driving the display 120 to present information stored in the buffer 122. In one example, the threshold may be set based on the capacity corresponding to the power-off level, which level may be varied based on the configuration of the device 100.

Still in reference to FIG. 1, the device 100 includes a main power management unit (PMU) 140 and a backup PMU 150. The main PMU 140 is used to manage the power supplied by the power source 130 to maintain normal operations of the components of the device 100, for example, by providing power supply signals to the processing unit 110 and the display 120. The backup PMU 150 may be used to continue providing the power supply signal to the display 120 with remaining capacity of the power source 130 when the remaining capacity is below the threshold.

In some implementations, the backup PMU 150 is deactivated in the normal operation of the device 100. That is, in the normal operations, the power supply is only managed by the main PMU 140. Only if the device 100 switches to the power-off mode due to insufficient battery capacity, the main PMU 140 is deactivated and the backup PMU 150 is activated to take over the display 120. In some implementations, the activation and deactivation of the main and backup PMUs 140 and 150 are controlled by the processing unit 110. For example, if the processing unit 110 detects that the remaining capacity of the power source 130 is going to be below the predetermined threshold, the processing unit 110 may deactivate the main PMU 140, for example, by sending a control signal. Accordingly, all the components supplied by the main PMU 140 stop operating. The remaining capacity of the power source 130 may be determined and measured by the main PMU 140 and then the processing unit 110 may be informed of the remaining capacity.

In parallel to or before deactivating the main PMU 140, the processing unit 110 may activate the backup PMU 150. For example, the processing unit 110 may generate a control signal to wake up the backup PMU 150. For example, double thresholding may be used to activate the backup PMU 150 before deactivating the main PMU 140. To be specific, if the remaining capacity of the power source 130 falls below a higher first threshold capacity, the processing unit 110 activates the backup PMU 150. Later, based on the remaining capacity of the power source 130 being below a lower second threshold capacity, the processing unit 110 deactivates the main PMU 140.

Alternatively, or in addition, the activation of the backup PMU 150 may be controlled by the user. For example, the user may use a hardware or software control(s) or a combination thereof to activate the backup PMU 150. For example, when the remaining capacity is detected to be low, the device 100 may provide the user with a notification and an option to activate the backup PMU 150. In response to the user input, the backup PMU 150 may be activated either immediately or at a later time, for example, when the remaining capacity of the power source 130 is below the predetermined threshold. In some implementations, the backup PMU 150, after being activated, will not supply the display 120 until the main PMU 140 is deactivated.

In some implementations, if the remaining capacity recovers, for example, due to the recharge of the power source 130, the backup PMU 150 may be deactivated and the main PMU 140 may be activated to provide power energy to the display 120 and other components of the device 100.

In the power-off mode of the device 100, with the capacity provided by the backup PMU 150, the display 120 is able to continue displaying information to the user. It would be appreciated that in the power-off mode, no new information will be provided to the display 120 for display because all the other components including the processing unit 110 of the device 100 have stopped operating. What is displayed on the display 120 is the information stored in the buffer 122.

In some implementations, when the remaining capacity of the power source 130 is detected to be below the threshold, the processing unit 110 stores the information to be displayed in the power-off mode into the buffer 122. A variety of information can be stored into the buffer 122. For example, the processing unit 110 may store some important information into the buffer 122 before switching into the power-off mode. The importance of information may be determined depending on various factors such as the degree of urgency, the user preference, or the like. The information having high importance (for example, higher than a predetermined metric) may be stored to the buffer 122. By way of example, if the processing unit 110 detects that there is an upcoming meeting, information about the meeting, such as the time, location, and/or attendees, can be stored into the buffer 122. Alternatively, or in addition, the information stored in the buffer 122 may include the contact list, calendar, email, map, and the like. In some implementations, different types of information can be organized into a suitable format and stored into the buffer 122.

Alternatively, or in addition, the information to be displayed on the display 120 in the power-off mode may be specified by the user. If the remaining capacity of the power source 130 is detected to be below the threshold, the processing unit 110 may store the user-specified information to the buffer 122, so that the user can still view the expected information on the display 120 even if the processing unit 110 is powered off. In yet another implementation, the processing unit 110 does not explicitly store any information before switching in to the power-off mode. At this point, the display 120 will display the last information stored in the buffer 122 with the power supplied by the backup PMU 150.

Figure 2:
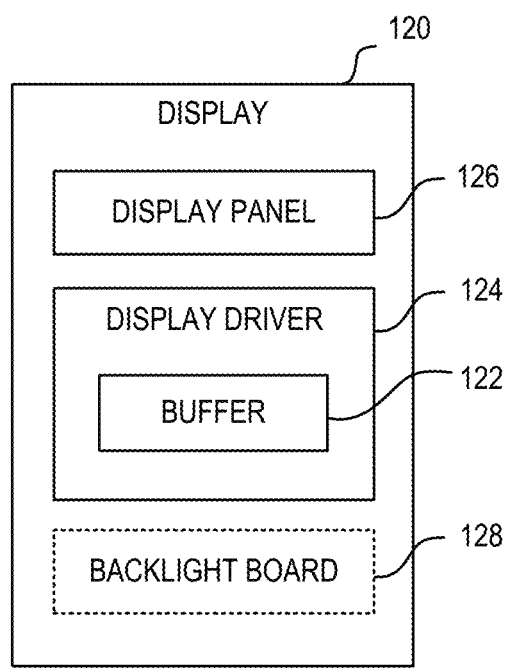
FIG. 2 illustrates a block diagram of a display of a device in accordance with one implementation of the subject matter described herein.

FIG. 2 shows a block diagram of an example display 120 of the device 100 in accordance with one implementation of the subject matter described herein. As described above, the display 120 has a buffer 122 to store information to be displayed. In the example of FIG. 2, the buffer 122 is used in conjunction with a display driver 124 integrated in the display 120. For example, the buffer 122 may be an internal graphic random access memory (RAM). It will be appreciated that the buffer 122 and the display driver 124 may be separated components in other examples. The display 120 may further include a display panel 126. The driver 124 may control illumination and/or color of the pixels of the display panel 126 so as to display the information stored in the buffer 122.

In operation, the display driver 124 may periodically refresh, which may be a major power drain of the display 120. Since the capacity of the power source 130 is limited, especially in the power-off mode, in some implementations, the display 120 may be switched to a power saving mode before the device 100 enters into the power-off mode. For example, if the remaining capacity is detected to be below the threshold for the power-off mode, the processing unit 110 may control the display 120 to switch to the power saving mode. In some implementations, to save the power, the refresh rate of the display driver 124 in the display 120 may be reduced by the processing unit 110 in the power saving mode. The display driver 124 may keep the reduced refresh rate in the power-off mode, which may therefore reduce the power consumption and increase the time for the displaying of the buffered information. The display 120 may be controlled in other manners to save the power.

In some implementations, the display panel 126 may be a mono-stable LCD display panel. Since the LCD display panel is a type of passive display panel, the display 120 may further include a backlight board 128 to light up the LCD display panel 126. The backlight board 128 may be any active display module, for example, a LED or OLED board. In some other implementations, the display panel 126 may be a LED or an OLED display panel. In these implementations, since the LED and the OLED display panels are both active display panels, the backlight board 128 may not be included in the display 120.

The display driver 124 (and the backlight board 128 in the case of LCD display panel, or the display panel 126 in the case of LED or OLED display panel) may be powered by the main PMU 140 in the normal operation of the device 100. For example, the main PMU 140 may provide the voltage of input/output (VIO) and the voltage of display driver (VDD) to the display driver 124. The main PMU 140 may also provide the voltage of LED (VLED) to the backlight board 128.

After the backup PMU 150 is activated, the power energy may be provided to the display driver 124 (including the buffer 122) so as to keep the display driver 124 maintaining the illumination/color control of the pixels of the display panel 126 and keep the buffer 122 storing the information. If the display panel 126 is a LCD display panel, the activated backup PMU 150 may not provide power energy to the backlight board 128 until an input is received from the user, which may reduce the power consumption. Without the power energy, the backlight board 128 may not emit lights and thus the buffered information may not be visible to the user. In the implementations where the display panel 126 is a LED or OLED display panel, the backup PMU 154 may provide power energy to both the display driver 124 and the display panel 126 after being activated. That is, the buffered information may be always displayed on the LED or OLED display panel 126.

Figure 3:
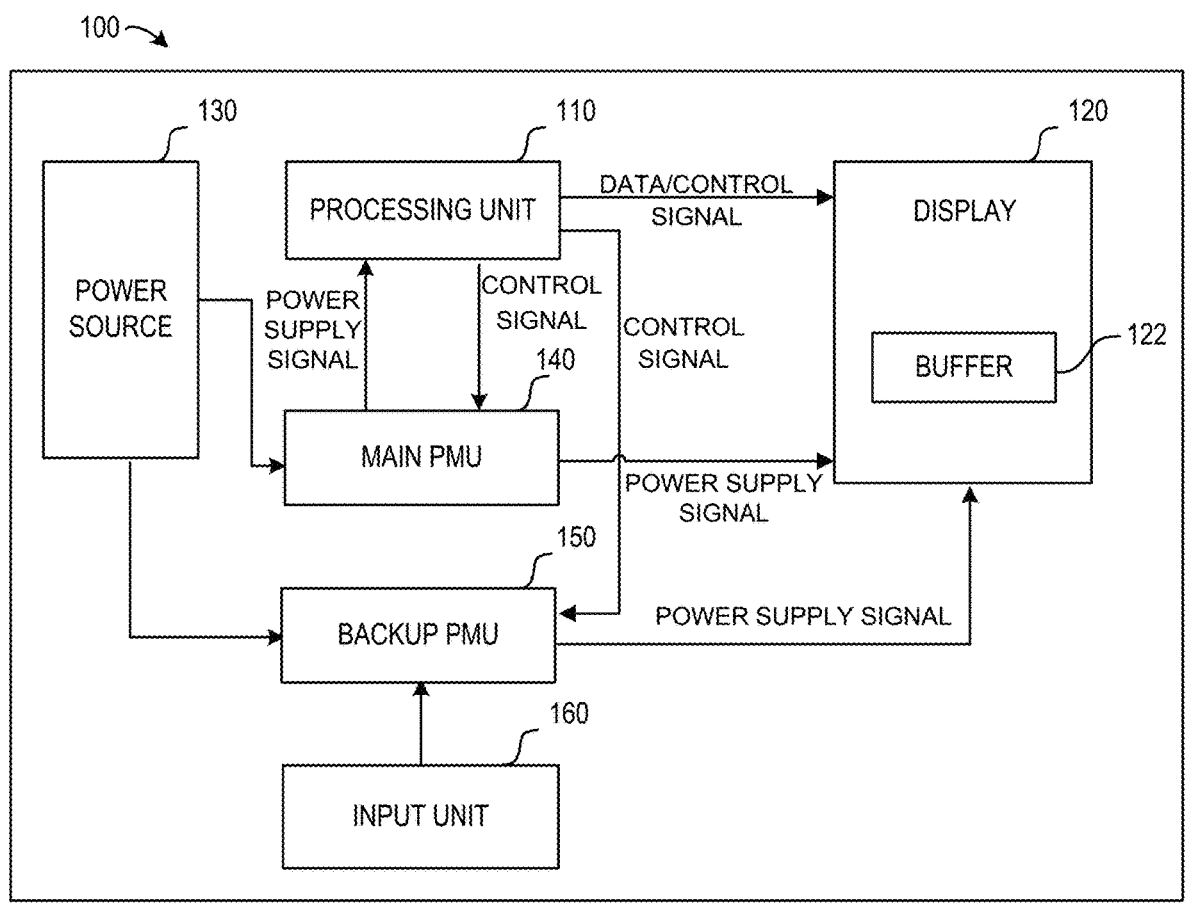
FIG. 3 illustrates a block diagram of a device in accordance with another implementation of the subject matter described herein.

In the implementations where the user is able to control the displaying of the buffered information, if a user input is detected, the backup PMU 150, after activated, may drive the display 120 to display the information in response to detecting the input. Specifically, in response to detecting the input, the activated backup PMU 150 may provide power energy to the backlight board 128, in addition to the driver 124 and the buffer 122. With the lights emitted by the backlight board 128, the information stored in the buffer 122 is visible on the display panel 126. In some implementations, the user input may be received by an input unit. FIG. 3 shows a block diagram of the device 100 in such implementations. As shown, the device 100 additionally includes an input unit 160. The input unit 160 may be connected to the backup PMU 150, so that the user input at the input unit 160 can be used to trigger the backup PMU 150 to drive the display 120. In some implementations, the backup PMU 150 may provide power energy to the input unit 160 if required.

One or more hardware components on the device 100 may be used as the input unit 160 for the user to control the displaying of the information in the power-off mode. For example, the hardware keys (not shown) for controlling the volume of the device 100 may be utilized. If the key for increasing the volume and the key for decreasing the volume are both detected to be pressed by the user, the backup PMU 150 may start providing power energy to drive the display 120, for example, to light up the backlight board 128. In some other examples, the hardware alphanumeric keys, power/lock button, and/or any other functional hardware keys may also be used for the user to control the backup PMU 150. Alternatively, or in addition, one or more dedicated components may be used to receive the user control of the displaying.

It is to be understood that the device 100 in FIG. 1 or FIG. 3 is only given for the purpose of illustration without suggesting any limitations as to the scope of the subject matter described herein. The device 100 may include more, less, or different components. For example, the device 100 may include a memory, such as volatile memory (e.g., registers, cache, RAM), non-volatile memory (e.g., ROM, EEPROM, flash memory), or some combination thereof. The device 100 may include any other components that use to support operations of the device.

Although the main PMU and backup PMU 140 and 150 of the device 100 are shown as two separate components, these two PMUs can be implemented by a single physical device. For example, the main PMU and backup PMU 140 and 150 may be integrated in the same circuitry. The main PMU 140 may be designed with electronic elements that can operate with a high voltage, while the backup PMU 150 may be designed with electronic elements that can operate with a low voltage.

Examples of the device 100 include any type of mobile terminal, fixed terminal, or portable terminal including a mobile phone (such as a phone shown in FIGS. 4A and 4B), desktop computer, laptop computer, notebook computer, netbook computer, tablet computer, personal communication system (PCS) device, personal navigation device, personal digital assistant (PDA), music/video player, digital camera/camcorder, positioning device, electronic book device, game device, or any combination thereof, including the accessories and peripherals of these devices, or any combination thereof. It will also be appreciated that the device 100 can support any type of interface to the user (such as "wearable" circuitry, etc.).

Figure 4A:
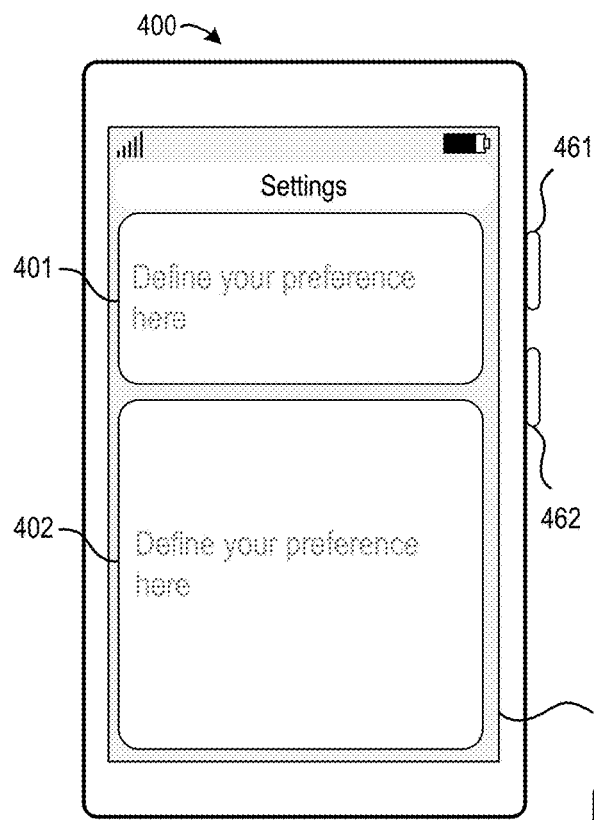
FIG. 4A and FIG. 4B illustrate perspective views of a display of a device in accordance with some implementations of the subject matter described herein.
Figure 4B:
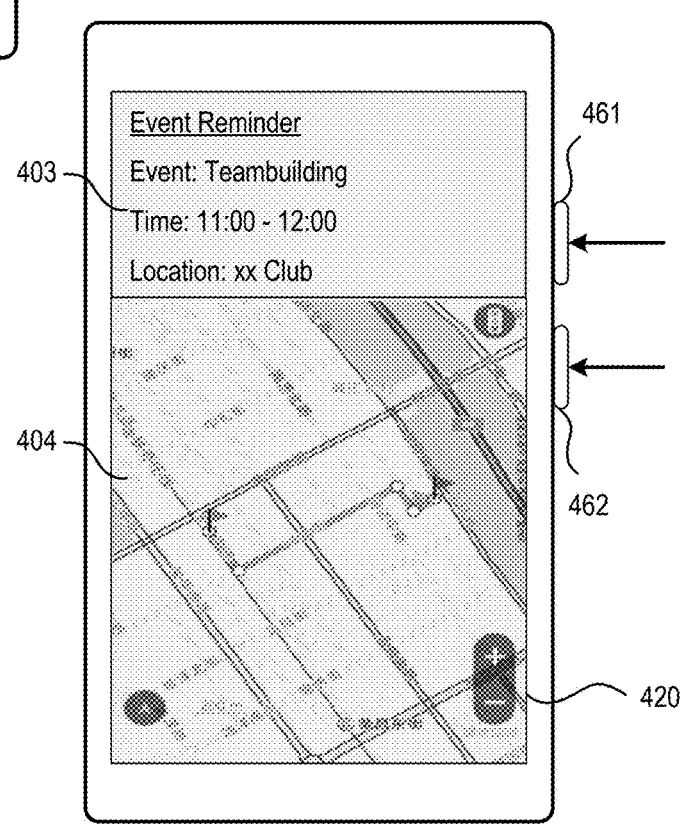

FIG. 4A and FIG. 4B show perspective views of a display of a device 400 in accordance with some implementations of the subject matter described herein. In the examples of FIG. 4A and FIG. 4B, a device 400 in the form of a mobile phone is shown with a display 420. The device 400 also includes two hardware keys 461 and 462 for controlling the increasing and decreasing of the volume in normal operation of the device 400. As shown in FIG. 4A, the device 400 still has sufficient capacity. A user interface is displayed on the display 420 for the user to specify information to be displayed in the power-off mode. For example, the user may select different types of information in the blocks 401 and 402 of FIG. 4A.

If the user wants to view an event reminder and a map in the power-off mode of the device 400, the processing unit (not shown) of the device 400 may store the corresponding information to the buffer (not shown) of the display 420 before the device 400 switches to the power-off mode. In the power-off mode, if presses on the keys 461 and 462 are detected, the event reminder and the map that are specified by the user may be displayed on the display 420, as indicated by 403 and 404 of FIG. 4B.

Figure 5:
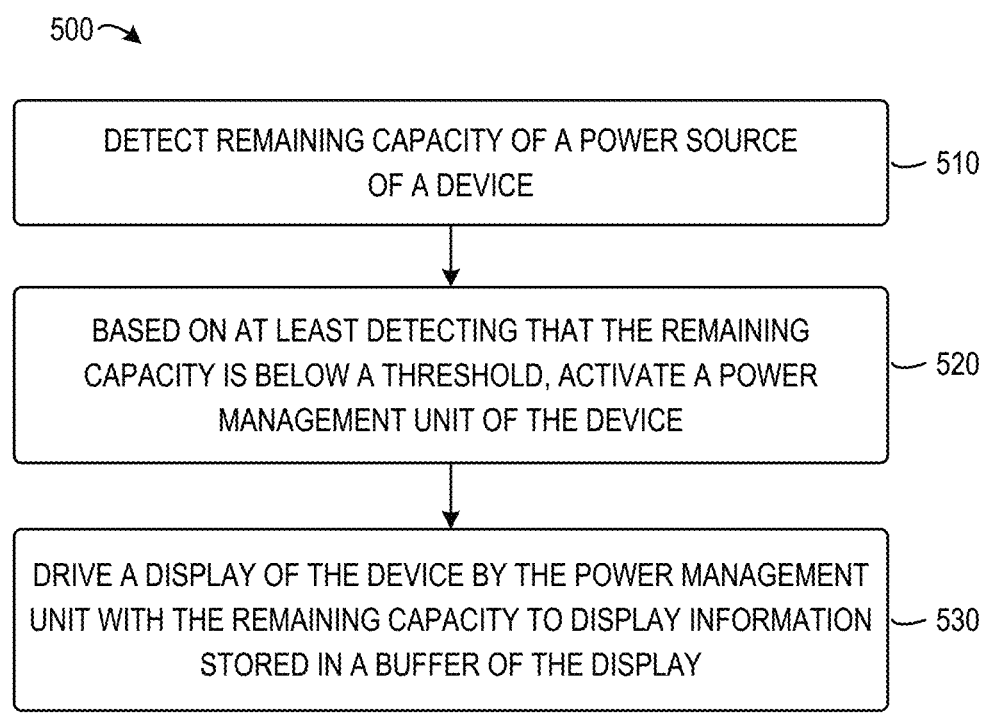
FIG. 5 illustrates a flowchart of a method for a device in accordance with one implementation of the subject matter described herein.

FIG. 5 illustrates a flowchart of a method for a device 500 in accordance with one implementation of the subject matter described herein. In step 510 of the method 500, remaining capacity of a power source of a device is detected. In step 520, based on at least detecting that the remaining capacity is below a threshold in step 510, a power management unit of the device is activated. A display of the device is driven by the power management unit with the remaining capacity to display information stored in a buffer of the display in step 530. Upon activation of the power management unit, in some implementations, based on at least the remaining capacity returning above the threshold, the power management unit may be deactivated.

In some implementations, an input from a user may be detected. In response to detecting the input, the buffer and the display of the device may be powered to display the information. Therefore, the user may be able to control when to display the information on the display.

In some implementations, based on at least detecting that the remaining capacity is below the threshold, the display may be switched to a power saving mode. In some examples, the refresh rate of the display may be reduced in the power saving mode. This may reduce the power consumption and increase the time for the displaying of the buffered information.

In some implementations, based on at least detecting that the remaining capacity is below the threshold, user-specified information may be stored to the buffer of the display. In some implementations, information having importance higher than a predetermined metric may be determined. Based on at least detecting that the remaining capacity is below the threshold, the determined information may be stored to the buffer of the display. In these implementations, the device can automatically preserve important information for the user.

The functionally described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination.

Some example implementations of the subject matter described herein are listed below.

In some implementations, a device is provided. The device comprises a power source and a display. The device also comprises a buffer in communication with the display, the buffer configured to store information to be displayed on the display. The device also comprises a power management unit configured to power the display and the buffer based on at least remaining capacity of the power source being below a threshold.

In some implementations, the power management unit is configured to be activated based on at least the remaining capacity being below the threshold.

In some implementations, the power management unit is configured to be deactivated based on at least the remaining capacity returning above the threshold.

In some implementations, the power management unit is configured to detect an input from a user and power the display and the buffer in response to detecting the input.

In some implementations, the display is configured to switch to a power saving mode based on at least the remaining capacity being below the threshold.

In some implementations, the device further comprises a processing unit configured to store user-specified information to the buffer based on at least detecting that the remaining capacity is below the threshold.

In some implementations, the device further comprises a processing unit configured to determine information having importance higher than a predetermined metric, and store the determined information to the buffer based on at least detecting that the remaining capacity is below the threshold.

In some implementations, the display includes a monostable LCD display panel, a LED display panel, or an OLED display panel.

In some implementations, a method is provided. The method comprises detecting remaining capacity of a power source of a device. The method further comprises based on at least detecting that the remaining capacity is below a threshold, activating a power management unit of the device, and driving a display of the device by the power management unit with the remaining capacity to display information stored in a buffer of the display.

In some implementations, the method further comprises, based on at least the remaining capacity returning above the threshold, deactivating the power management unit.

In some implementations, the method further comprises detecting an input from a user, and driving the display in response to detecting the input.

In some implementations, the method further comprises, based on at least detecting that the remaining capacity is below the threshold, switching the display to a power saving mode.

In some implementations, the method further comprises, based on at least detecting that the remaining capacity is below the threshold, storing user-specified information to the buffer of the display.

In some implementations, the method further comprises determining information having importance higher than a predetermined metric, and based on at least detecting that the remaining capacity is below the threshold, storing the determined information to the buffer of the display.

In some implementations, a computer program product is provided. The computer program product is tangibly stored on a non-transient machine-readable medium and comprising machine-executable instructions, the instructions, when executed on at least one processor of a device, causing the device to: detect remaining capacity of a power source of a device; based on at least detecting that the remaining capacity is below a threshold, activate power management unit of the device; and drive a display of the device by the power management unit with the remaining capacity to display information stored in a buffer of the display.

In some implementations, the instructions, when executed on at least one processor of a device, further cause the device to, based on at least the remaining capacity returning above the threshold, deactivate the power management unit.

In some implementations, the instructions, when executed on at least one processor of a device, further cause the device to detect an input from a user, and drive the display in response to detecting the input.

In some implementations, the instructions, when executed on at least one processor of a device, further cause the device to, based on at least detecting that the remaining capacity is below the threshold, switch the display to a power saving mode.

In some implementations, the instructions, when executed on at least one processor of a device, further cause the device to, based on at least detecting that the remaining capacity is below the threshold, store user-specified information to the buffer of the display.

In some implementations, the instructions, when executed on at least one processor of a device, further cause the device to, determine information having importance higher than a predetermined metric, and based on at least detecting that the remaining capacity is below the threshold, store the determined information to the buffer of the display.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A mobile computing device comprising:
   a battery;
   a processing unit;
   a display;
   a buffer in communication with the display, the buffer configured to store information from the processing unit to be displayed on the display;
   a main power management device in the mobile computing device; and
   a backup power management device in the mobile computing device; and
   a processing unit configured to:
      control the main power management device to transmit a power supply signal conveying power from the battery to the processing unit, the display, and the buffer based on at least remaining capacity of the battery being above a threshold;
      control the main power management device to cease conveying the power from the battery to the display, the buffer, and the processing unit when the remaining capacity of the battery is below the threshold, and
      control the backup power management device to, at least while the processing unit is powered off, convey the power from the battery to the display and the buffer when the remaining capacity of the battery is below the threshold.

2. The mobile computing device of claim 1, wherein the backup power management device is configured to be deactivated based on at least the remaining capacity returning above the threshold.

3. The mobile computing device of claim 1, wherein the backup power management device is configured to:

detect an input from a user; and transmit a power supply signal to the display and the buffer in response to detecting the input.

4. The mobile computing device of claim 1, wherein the display is configured to switch to a power saving mode based on at least the remaining capacity being below the threshold.

5. The mobile computing device of claim 1, wherein the processing unit is configured to store user-specified information to the buffer based on at least detecting that the remaining capacity is below the threshold.

6. The mobile computing device of claim 1, wherein the processing unit is configured to:

determine information having importance higher than a predetermined metric, and store the determined information to the buffer based on at least detecting that the remaining capacity is below the threshold.

7. The mobile computing device of claim 1, wherein the display includes:

a mono-stable liquid crystal display (LCD) display panel;

a light emitting diode (LED) display panel; or an organic light emitting diode (OLED) display panel.

8. A method comprising:

detecting remaining capacity of a battery of a mobile computing device;

based on at least detecting that the remaining capacity is above a threshold, transmitting a power supply signal conveying power from the battery to a processing unit, a display, and a buffer storing information to be displayed on the display with a main power management device in the mobile computing device; and based on at least detecting that the remaining capacity is below the threshold:

controlling the main power management device to cease conveying the power from the battery to the display, the buffer, and the processing unit when the remaining capacity of the battery is below the threshold, and controlling a backup power management device in the mobile computing device to, at least while the processing unit is powered off, convey the power from the battery to the display and the buffer when the remaining capacity of the battery is below the threshold.

9. The method of claim 8, further comprising:

based on at least the remaining capacity returning above the threshold, deactivating the backup power management device.

10. The method of claim 8, further comprising:

detecting an input from a user; and driving the display in response to detecting the input.

11. The method of claim 8, further comprising:

based on at least detecting that the remaining capacity is below the threshold, switching the display to a power saving mode.

12. The method of claim 8, further comprising:

based on at least detecting that the remaining capacity is below the threshold, storing user-specified information to the buffer of the display.

13. The method of claim 8, further comprising:

determining information having importance higher than a predetermined metric; and based on at least detecting that the remaining capacity is below the threshold, storing the determined information to the buffer of the display.

14. A computer program product being tangibly stored on a non-transient machine-readable medium and comprising machine-executable instructions, the instructions, when executed on at least one processor of a mobile computing device, causing the mobile computing device to:

detect remaining capacity of a battery of the mobile computing device;

based on at least detecting that the remaining capacity is above a threshold, transmit a power supply signal conveying power from the battery to a processing unit, a display, and a buffer storing information to be displayed on the display with a main power management device in the mobile computing device; and based on at least detecting that the remaining capacity is below the threshold:

control the main power management device to cease conveying the power from the battery to the display, the buffer, and the processing unit when the remaining capacity of the battery is below the threshold, and control a backup power management device in the mobile computing device to, at least while the processing unit is powered off, convey the power from the battery to the display and the buffer when the remaining capacity of the battery is below the threshold.

15. The computer program product of claim 14, wherein the instructions, when executed on the at least one processor of the mobile computing device, further cause the device to:

based on at least the remaining capacity returning above the threshold, deactivate the backup power management device.

16. The computer program product of claim 14, wherein the instructions, when executed on the at least one processor of the mobile computing device, further cause the device to:

detect an input from a user; and drive the display in response to detecting the input.

17. The computer program product of claim 14, wherein the instructions, when executed on the at least one processor of the mobile computing device, further cause the device to:

based on at least detecting that the remaining capacity is below the threshold, switch the display to a power saving mode.

18. The computer program product of claim 14, wherein the instructions, when executed on the at least one processor of the mobile computing device, further cause the device to:

based on at least detecting that the remaining capacity is below the threshold, store user-specified information to the buffer of the display.

19. The computer program product of claim 14, wherein the instructions, when executed on the at least one processor of the mobile computing device, further cause the device to:

determine information having importance higher than a predetermined metric; and based on at least detecting that the remaining capacity is below the threshold, store the determined information to the buffer of the display.

20. The mobile computing device of claim 1, wherein the main power management device is further configured to be deactivated based on at least the remaining capacity being below an additional threshold lower than the threshold.

* * * * *